US012017496B2

(12) United States Patent
Tokuhara

(10) Patent No.: US 12,017,496 B2
(45) Date of Patent: Jun. 25, 2024

(54) MOTOR SHAFT STATE DETECTION METHOD, MOTOR CONTROL METHOD, MOTOR SHAFT STATE DETECTION DEVICE, MOTOR CONTROL DEVICE, VEHICLE HEIGHT ADJUSTMENT DEVICE, SADDLE-TYPE VEHICLE

(71) Applicant: Hitachi Astemo, Ltd., Hitachinaka (JP)

(72) Inventor: Masato Tokuhara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 276 days.

(21) Appl. No.: 17/694,568

(22) Filed: Mar. 14, 2022

(65) Prior Publication Data
US 2022/0203795 A1 Jun. 30, 2022

Related U.S. Application Data

(63) Continuation of application No. PCT/JP2020/011694, filed on Mar. 17, 2020.

(51) Int. Cl.
*B60G 15/06* (2006.01)
*B60G 17/015* (2006.01)
(Continued)

(52) U.S. Cl.
CPC ....... *B60G 17/0157* (2013.01); *B60G 15/062* (2013.01); *B60G 17/0182* (2013.01);
(Continued)

(58) Field of Classification Search
CPC .............. B60G 15/062; B60G 17/0157; B60G 17/0182; B60G 17/019; B60G 2202/42;
(Continued)

(56) References Cited

U.S. PATENT DOCUMENTS 8,251,376 B2 * 8/2012 Mouri .................. F16F 9/56
280/5.515
2004/0227483 A1 11/2004 Katsumata et al.
(Continued)

FOREIGN PATENT DOCUMENTS

JP 2004304880 A 10/2004
JP 2004308200 A 11/2004
(Continued)

OTHER PUBLICATIONS

International Search Report dated Jun. 9, 2020 for the corresponding International Patent Application No. PCT/JP2020/011694, 3 pages [English translation attached].
(Continued)

*Primary Examiner* — Erick R Solis
(74) *Attorney, Agent, or Firm* — Leason Ellis LLP; Edward J. Ellis; Melvin C. Garner

(57) ABSTRACT

This motor shaft state detection method has: a rotation determination step for determining, using a detected current waveform of a motor, whether or not to be a non-rotational state in which the rotational speed of the motor is smaller than a predetermined speed; a current determination step for determining whether or not to be a supply state in which the absolute value of current supplied to the motor is larger than a predetermined reference value; and a determination step for, when it is determined to be the non-rotational state in the rotation determination step and it is determined to be the supply state in the current determination step, determining that the motor is in a shaft locked state.

20 Claims, 10 Drawing Sheets

(51) Int. Cl.
*B60G 17/018* (2006.01)
*B60G 17/019* (2006.01)

(52) U.S. Cl.
CPC ...... *B60G 2202/42* (2013.01); *B60G 2300/12* (2013.01); *B60G 2400/20* (2013.01); *B60G 2400/25* (2013.01); *B60G 2400/91* (2013.01); *B60G 2500/30* (2013.01); *B60G 2600/602* (2013.01); *B60G 2600/604* (2013.01); *B60G 2800/914* (2013.01)

(58) Field of Classification Search
CPC .......... B60G 2202/422; B60G 2300/12; B60G 2400/252; B60G 2600/60; B60G 2600/602; B60G 2600/604; B60G 2800/914
USPC ...................................................... 701/37–40
See application file for complete search history.

(56) References Cited

U.S. PATENT DOCUMENTS

| | | | |
|---|---|---|---|
| 2004/0246637 A1 | 12/2004 | Tanaka et al. | |
| 2009/0295322 A1* | 12/2009 | Noda | H02P 29/032 318/566 |
| 2010/0168959 A1* | 7/2010 | Iwami | B60G 17/0152 280/124.157 |
| 2016/0221410 A1* | 8/2016 | Mersmann | B60G 17/00 |
| 2019/0001776 A1 | 1/2019 | Murakami et al. | |

FOREIGN PATENT DOCUMENTS

| | | |
|---|---|---|
| JP | 5155055 B2 | 12/2012 |
| JP | 2016160968 A | 9/2016 |
| JP | 2018144650 A | 9/2018 |

OTHER PUBLICATIONS

International Written Opinion dated Jun. 9, 2020 for the corresponding International Patent Application No. PCT/JP2020/011694, 4 pages.

* cited by examiner

MOTOR SHAFT STATE DETECTION METHOD, MOTOR CONTROL METHOD, MOTOR SHAFT STATE DETECTION DEVICE, MOTOR CONTROL DEVICE, VEHICLE HEIGHT ADJUSTMENT DEVICE, SADDLE-TYPE VEHICLE

CROSS REFERENCE TO RELATED APPLICATIONS

This application is a Continuation of International Patent Application No. PCT/JP2020/011694 filed on Mar. 17, 2020, the content of which is incorporated herein by reference in its entirety.

FIELD OF THE INVENTION

The present invention relates to a motor shaft state sensing method, a motor control method, a motor shaft state sensing device, a motor control device, a vehicle height adjustment device, and a saddle-type vehicle.

BACKGROUND OF THE INVENTION

In recent years, suggested is a device configured to adjust a height (vehicle height) of a vehicle main body of a vehicle so as to adjust a posture of the vehicle, for example.

For example, a front fork, a rear suspension and a control device described in JP 2018-144650 A are examples of a device for adjusting a vehicle height of a two-wheeled motor vehicle.

In addition, a device described in JP 2016-160968 A includes a vehicle height adjustment suspension having a support member configured to support one end of a suspension spring and a jack chamber, and configured to change a vehicle height of a vehicle body by moving the support member by supply of a liquid to the jack chamber. Further, the device described in JP 2016-160968 A includes a hydraulic pump, which has a pump-side oil chamber connected to the jack chamber via an oil passage and variable in capacity by movement of a pump-side piston and is configured to supply the liquid from the pump-side oil chamber to the jack chamber, a motor configured to drive the pump-side piston, and a control device configured to control drive of the motor. More specifically, the hydraulic pump includes a thin cylindrical pump-side cylinder and a cover part configured to close each of both end portions of the cylindrical pump-side cylinder in a center line direction.

PTL 1: JP 2018-144650 A
PTL 2: JP 2016-160968 A

In the hydraulic pump of the device described in JP 2016-160968 A, when the piston (pump-side piston) finishes discharging the liquid from the reservoir chamber (pump-side oil chamber) and is in a state of being butted against the cover part that closes the end portions of the cylinder (pump-side cylinder), a rotating shaft of the motor does not rotate because it is in a locked state, even when current is supplied to the motor so as to move the piston for discharging the liquid. In a case where the rotating shaft of the motor is in a locked state (hereinafter, this state may also be referred to as 'shaft locked state'), if the current is continuously supplied, the motor may generate heat. Therefore, it is important to sense that the rotating shaft of the motor is in the shaft locked state As a method of sensing the shaft locked state, for example, a method of sensing a shaft locked state when a current value supplied to the motor is larger than a reference value is considered. However, depending on environments, such as when the piston starts to move at a low temperature, the current value supplied to the motor may become larger than the reference value. Therefore, there is a concern that it is decided to be the shaft locked state even when it is not actually the shaft locked state. For this reason, according to this method, it is not possible to set the reference value, so that the shaft locked state may not be sensed with high accuracy.

An object of the present invention is to provide a motor shaft state sensing method and the like capable of accurately sensing that a motor is in a shaft locked state, regardless of change in environment.

SUMMARY OF INVENTION

In the below, the present disclosure is described.

One aspect of the present disclosure is a motor shaft state sensing method including a rotation determination step of determining, using a detected current waveform of a motor, whether or not to be a non-rotation state in which a rotation speed of the motor is smaller than a predetermined speed; a current determination step of determining whether or not to be a supply state in which an absolute value of current supplied to the motor is larger than a predetermined reference value; and a decision step of deciding that the motor is in a shaft locked state, when it is determined to be the non-rotation state in the rotation determination step and it is determined to be the supply state in the current determination step.

Here, in the rotation determination step, the rotation speed may be perceived using a frequency of a waveform extracted by using the current waveform.

In addition, the motor may be a motor provided to a vehicle height adjustment device.

Another aspect of the present disclosure is a motor control method including a sensing step of sensing the shaft locked state by the motor shaft state sensing method according to the above-described aspect; and a stop step of stopping supply of current to the motor when the shaft locked state is sensed in the sensing step.

Another aspect of the present disclosure is a motor control method including a sensing step of sensing the shaft locked state by the motor shaft state sensing method according to the above-described aspect; and a supply step of supplying current of a reverse direction to the motor when the shaft locked state is sensed in the sensing step.

Another aspect of the present disclosure is a motor shaft state sensing device including a rotation determination unit configured to determine, using a detected current waveform of a motor, whether or not to be a non-rotation state in which a rotation speed of the motor is smaller than a predetermined speed; a current determination unit configured to determine whether or not to be a supply state in which an absolute value of current supplied to the motor is larger than a predetermined reference value; and a decision unit configured to decide that the motor is in a shaft locked state, when it is determined to be the non-rotation state with the rotation determination unit and it is determined to be the supply state with the current determination unit.

Here, the rotation determination unit may be configured to perceive the rotation speed by using a frequency of a waveform extracted by using the current waveform.

Another aspect of the present disclosure is a motor control device including the motor shaft state sensing device according to the above-described aspect; and a stop unit configured to stop supply of current to the motor when it is decided to be the shaft locked state with the motor shaft state sensing device.

Another aspect of the present disclosure is a motor control device including the motor shaft state sensing device according to the above-described aspect; and a supply unit configured to supply current of a reverse direction to the motor when it is decided to be the shaft locked state with the motor shaft state sensing device.

Another aspect of the present disclosure is a vehicle height adjustment device including a suspension device having a spring; and an adjustment unit configured to adjust a load of the spring by using the motor whose operation is controlled by the motor control device according to the above-described aspect.

Here, the motor control device may include an estimation unit configured to estimate, by using a detected current waveform of a motor, an amount of movement of a support member configured to support an end portion of the spring; and a setting unit configured to set a target current to be supplied to the motor by using the amount of movement estimated by the estimation unit, when it is not decided to be the shaft locked state with the motor shaft state sensing device.

Another aspect of the present disclosure is a saddle-type vehicle including a vehicle main body; a front wheel arranged on a front side of the vehicle main body and a rear wheel arranged on a rear side of the vehicle main body; a first suspension device arranged between the vehicle main body and the front wheel; a second suspension device arranged between the vehicle main body and the rear wheel and having a spring; and the vehicle height adjustment device configured to adjust at least a load of the spring according to the above-described aspect.

According to the present invention, it is possible to provide the motor shaft state sensing method and the like capable of accurately sensing that the motor is in the shaft locked state, regardless of change in environment.

DETAILED DESCRIPTION OF THE INVENTION

Hereinafter, embodiments of the present invention will be described in detail with reference to the accompanying drawings. Note that, the embodiments described below are examples of the embodiment of the present invention, and the present invention is not limited to the embodiments described below.

First Embodiment

Figure 1:
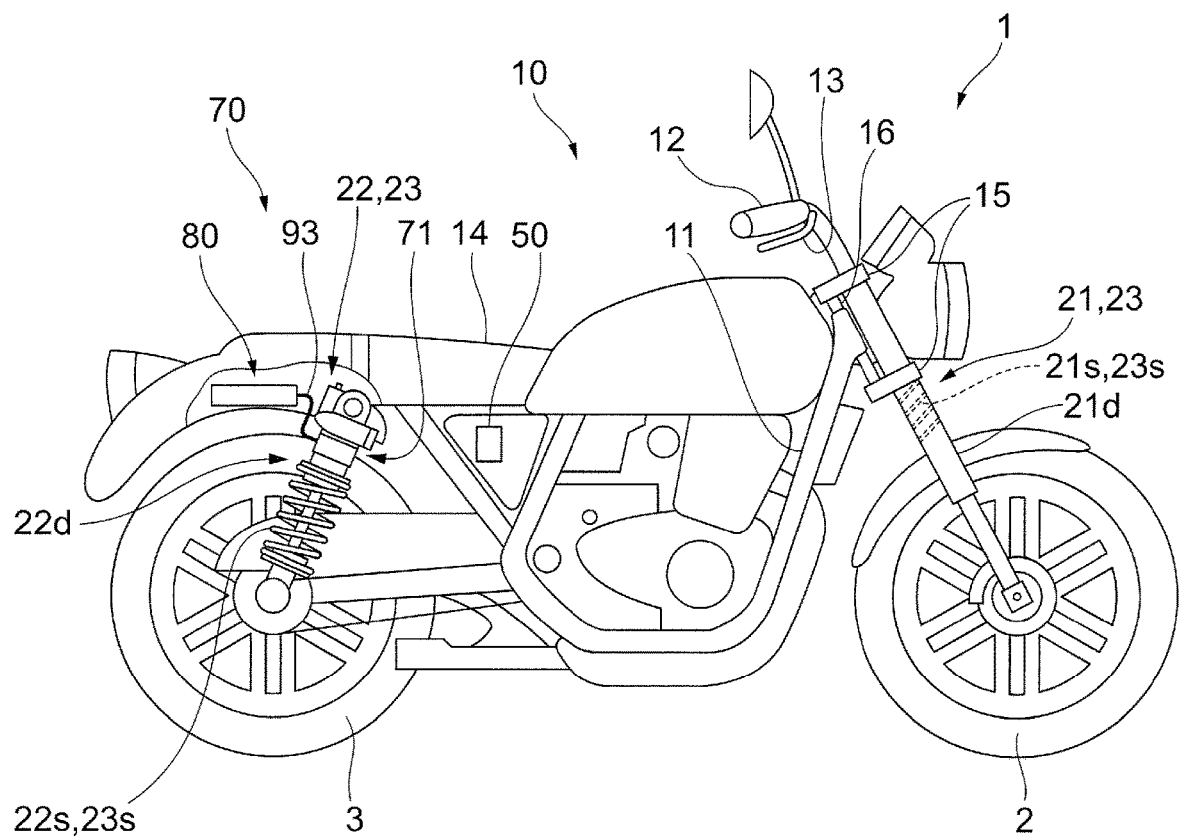
FIG. 1 shows an example of a schematic configuration of a two-wheeled motor vehicle 1 according to a first embodiment.
Figure 1:
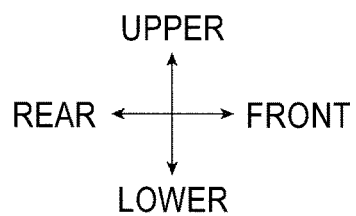

FIG. 1 shows an example of a schematic configuration of a two-wheeled motor vehicle 1 according to a first embodiment.

Figure 2:
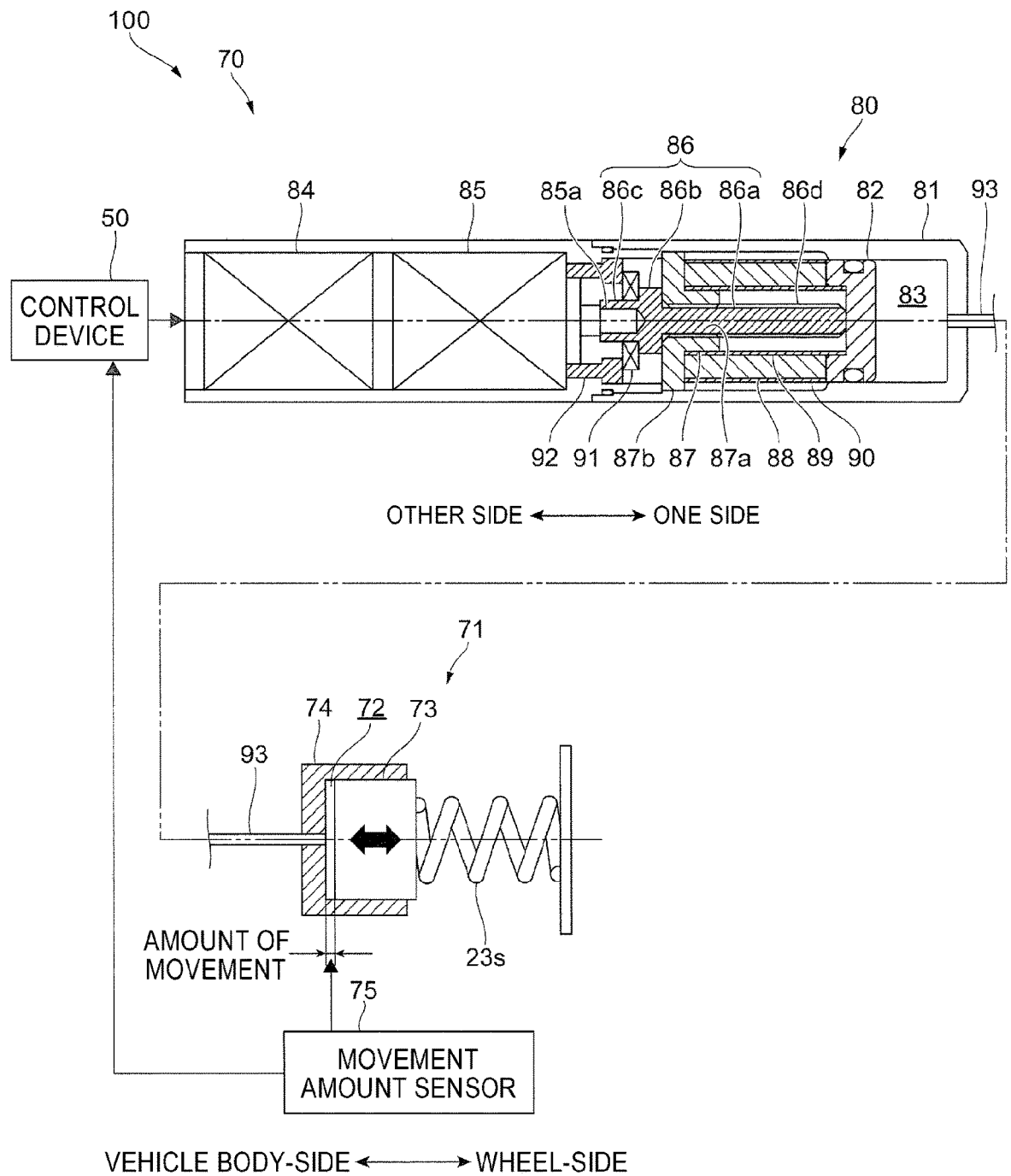
FIG. 2 shows an example of a schematic configuration of a vehicle height adjustment device 100.

FIG. 2 shows an example of a schematic configuration of a vehicle height adjustment device 100.

The two-wheeled motor vehicle 1 as an example of the straddle-type vehicle has a front wheel 2, which is a wheel on a front side, and a rear wheel 3, which is a wheel on a rear side. In addition, the two-wheeled motor vehicle 1 includes a vehicle body frame 11 forming a skeleton of the two-wheeled motor vehicle 1, a handle 12, a brake lever 13, and a vehicle main body 10 having a seat 14. In descriptions below, the front wheel 2 and the rear wheel 3 may also be collectively referred to as 'wheel', and the vehicle main body 10 may also be referred to as 'vehicle body'.

In addition, the two-wheeled motor vehicle 1 includes front forks 21 that are a first suspension device configured to connect the front wheel 2 and the vehicle body 10 each other. Further, the two-wheeled motor vehicle 1 includes two brackets 15 configured to hold the two front forks 21 arranged on each of left and right sides of the front wheel 2, and a shaft 16 arranged between the two brackets 15. The shaft 16 is rotatably supported by the vehicle body frame 11. The front fork 21 has a suspension spring 21s configured to absorb an impact applied to the front wheel 2 from a road surface or the like, and a damping device 21d configured to attenuate vibration of the suspension spring 21s.

In addition, the two-wheeled motor vehicle 1 includes rear suspensions 22, which are a second suspension device configured to connect the rear wheel 3 and the vehicle body 10 each other, provided on each of left and right sides of the rear wheel 3. The rear suspension 22 has a suspension spring 22s configured to absorb an impact applied to the rear wheel 3 from a road surface or the like, and a damping device 22d configured to attenuate vibration of the suspension spring 22s.

Note that, in descriptions below, the front fork 21 and the rear suspension 22 may also be collectively referred to as 'suspension device 23'. In addition, the suspension spring 21s and the suspension spring 22s may also be collectively referred to as 'spring 23s'.

Further, the two-wheeled motor vehicle 1 includes an adjustment unit 70 configured to adjust a height of the vehicle main body 10, in other words, a vehicle height by changing an initial load (preload) that is applied to the spring 23s.

Further, the two-wheeled motor vehicle 1 includes a control device 50 configured to control the initial load of the spring 23s.

(Adjustment Unit 70) The adjustment unit 70 includes a jack unit 71 provided to the suspension device 23 and configured to adjust a length of the spring 23s, and a supply device 80 configured to supply oil to a jack chamber 72 of the jack unit 71.

As shown in FIG. 2, the jack unit 71 has a support member 73 configured to support an end portion of the spring 23s on the vehicle body-side, and a forming member 74 configured to form the jack chamber 72 together with the support member 73, and is configured to adjust a length of the spring 23s as the support member 73 moves according to an amount of oil in the jack chamber 72. It may be exemplified that the support member 73, the jack chamber 72, and the forming member 74 are implemented by the support member of the rear suspension or the front fork, the jack chamber and the hydraulic jack described in JP 2018-144650 A, respectively.

In addition, the jack unit 71 includes a movement amount sensor 75 configured to detect an amount of movement of the support member 73. An amount of movement of the support member 73 that is detected by the movement amount sensor 75 is an amount of movement when an amount of movement at a time when the support member 73 is located at a reference position is 0. The reference position is a position of the support member 73 when the oil in the jack chamber 72 is 0. As the movement amount sensor 75, for example, a sensor may be exemplified in which a coil is wound on an outer peripheral surface of the forming member 74, the support member 73 is made of a magnetic material, and an amount of movement of the support member 73 is detected using an inductance of the coil changing according to movement of the support member 73 with respect to the forming member 74.

As shown in FIG. 2, the supply device 80 includes a housing 81 configured to store oil and a circular cylinder-shaped piston 82 configured to slide in the housing 81. A reservoir chamber 83 configured to store oil is formed in a space surrounded by an inner surface of the housing 81 and the piston 82.

In addition, the supply device 80 includes a motor 84, a speed reducer 85 configured to reduce a rotation speed of the motor 84, and a screw 86 connected to an output shaft 85a of the speed reducer 85.

As the motor 84, a direct current (DC) motor with a brush may be exemplified. Drive of the motor 84 is controlled by the control device 50. As the speed reducer 85, a planetary speed reducer using a well-known planetary gear mechanism may be exemplified.

The screw 86 has a first portion 86a, a second portion 86b, and a third portion 86c, which are three circular cylinder-shaped portions having different diameters, sequentially from one side (right side in FIG. 2) to the other side (left side in FIG. 2) in a rotation axis direction. An outer diameter of the second portion 86b is larger than an outer diameter of the first portion 86a and an outer diameter of the third portion 86c. A male screw 86d is formed on an outer peripheral surface of the first portion 86a. The output shaft 85a of the speed reducer 85 is fitted on an inner side of the third portion 86c. Thereby, the screw 86 is configured to rotate integrally with the output shaft 85a of the speed reducer 85.

In addition, the supply device 80 includes a nut 87 having a female screw 87a formed thereon in mesh with the male screw 86d formed on the first portion 86a of the screw 86. The nut 87 has a flange 87b at an end portion on the other side.

Further, the supply device 80 includes an interposition member 88 interposed between the flange 87b of the nut 87 and the piston 82, and a cylindrical collar 89 arranged on an inner side of the interposition member 88 and on an outer side of the nut 87, and a cylindrical collar 90 arranged on an outer side of the interposition member 88. The interposition member 88 is an elastic member, and is sandwiched between the piston 82 and the flange 87b of the nut 87 in a state of being elastically deformed by being pressed by the piston 82 receiving a force from oil. Thereby, the interposition member 88 suppresses the nut 87 from rotating as the screw 86 rotates.

In addition, the supply device 80 includes a bearing 91 configured to rotatably support the screw 86, and a support member 92 configured to support the bearing 91. The bearing 91 is arranged between the support member 92 and the second portion 86b of the screw 86.

The piston 82, the motor 84, the speed reducer 85, the screw 86, the nut 87, the interposition member 88, the collar 89, the collar 90, the bearing 91, and the support member 92 described above are accommodated in the housing 81.

The supply device 80 includes a hose 93 mounted to the housing 81, provided between the reservoir chamber 83 and the jack chamber 72 of the jack unit 71 and configured to allow oil to flow between the reservoir chamber 83 and the jack chamber 72.

In the adjustment unit 70 configured as described above, the shaft of the motor 84 of the supply device 80 rotates in one direction, so that the screw 86 rotates in one direction and the nut 87 moves toward one side in the rotation axis direction. As the nut 87 moves, the collar 89, the collar 90, and the interposition member 88 receive a force from the other side toward one side in the rotation axis direction, thereby moving the piston 82 toward one side. Thereby, the piston 82 discharges the oil from the reservoir chamber 83. Then, the oil is supplied into the jack chamber 72 via the hose 93. As a result, the support member 73 moves toward the wheel-side (right side in FIG. 2) with respect to the forming member 74, in other words, the amount of movement of the support member 73 from the reference position increases, and the spring length of the spring 23s is shortened.

When the spring length of the spring 23s is shortened, a spring force by which the spring 23s pushes the support member 73 increases, as compared to a spring force before the support member 73 moves with respect to the forming member 74. As a result, even when a force acts on the wheel-side from the vehicle body, an initial load that does not change relative positions of the vehicle body and the wheel increases. In such a case, when the same force acts on the wheel-side from the vehicle body-side, a sinking amount of the suspension device 23 (change in distance between the vehicle body and the wheel) decreases. For this reason, when the spring length of the spring 23s is shortened due to the movement of the support member 73 with respect to the forming member 74, a height of the vehicle main body 10 increases (vehicle height increases), as compared to a height before the support member 73 moves with respect to the forming member 74.

On the other hand, when the shaft of the motor 84 of the supply device 80 rotates in the other direction, the screw 86 rotates in the other direction. Then, the force from the piston 82 that receives the force of the oil in the reservoir chamber 83 acts on the flange 87b of the nut 87 via the collar 89, the collar 90, and the interposition member 88, and the nut 87 moves toward the other side in the rotation axis direction. As the nut 87 moves toward the other side, a volume of the reservoir chamber 83 increases. Thereby, the support member 73 discharges the oil in the jack chamber 72, and this oil is supplied to the reservoir chamber 83. As a result, the support member 73 moves toward the vehicle body-side (left side in FIG. 2) with respect to the forming member 74, in other words, the amount of movement of the support member 73 from the reference position decreases, and the spring length of the spring 23s is lengthened.

When the spring length of the spring 23s is lengthened, the spring force by which the spring 23s pushes the support member 73 decreases, as compared to the spring force before the support member 73 moves with respect to the forming member 74. As a result, when the same force acts on the wheel-side from the vehicle body-side, the sinking amount of the suspension device 23 increases. For this reason, when the spring length of the spring 23s is lengthened due to the movement of the support member 73 with respect to the forming member 74, the height of the vehicle main body 10 decreases (vehicle height decreases), as compared to the height before the support member 73 moves with respect to the forming member 74.

The vehicle height adjustment device 100 configured to adjust the vehicle height of the two-wheeled motor vehicle 1 is constituted by the adjustment unit 70 configured as described above, the control device 50, and the like.

(Control Device 50)

Next, the control device 50 is described.

Figure 3:
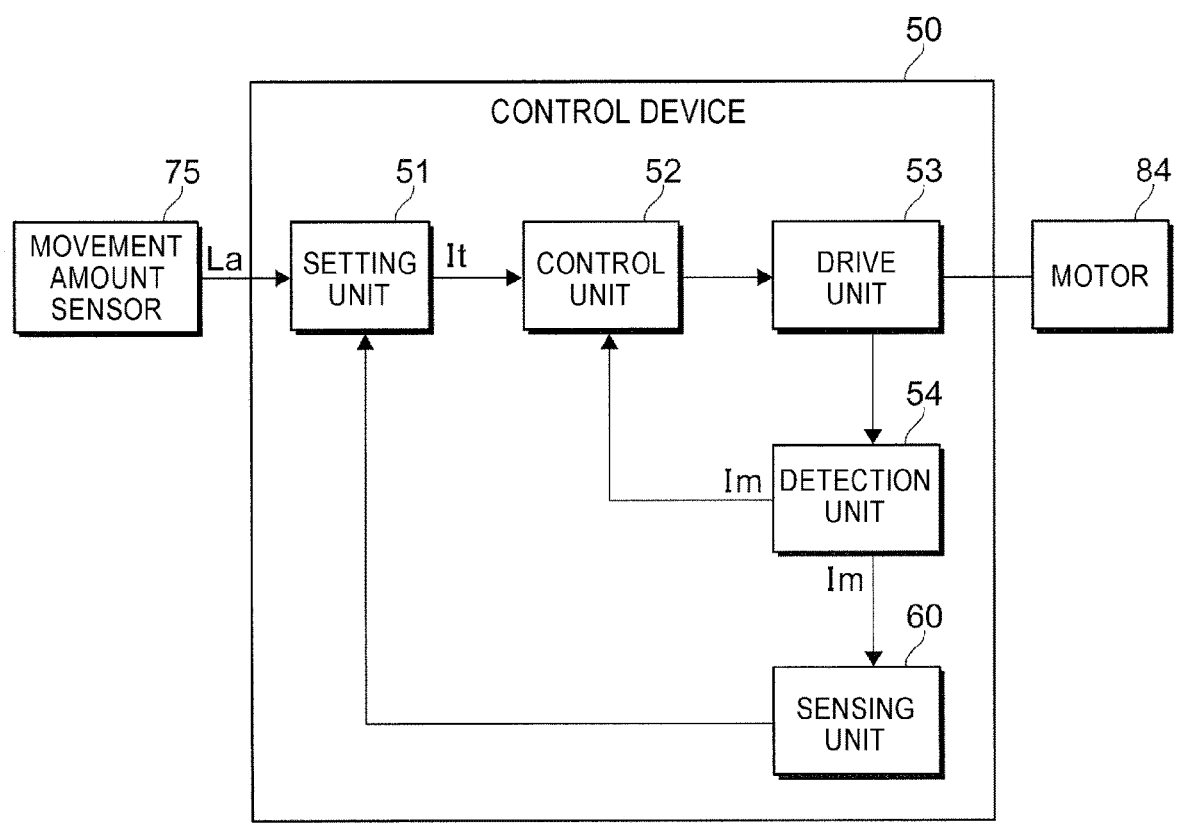
FIG. 3 shows an example of a block diagram of a control device 50.

FIG. 3 shows an example of a block diagram of the control device 50.

The control device 50 includes a CPU, a ROM in which programs to be executed by the CPU, various data, and the like are stored, a RAM used as a work memory of the CPU, and the like, and an EEPROM that is a non-volatile memory. Output signal from the movement amount sensor 75 and the like are input to the control device 50.

The control device 50 includes a setting unit 51 configured to set a target current It to be supplied to the motor 84, a control unit 52 configured to control drive of the motor 84, and a drive unit 53 configured to drive the motor 84. In addition, the control device 50 includes a detection unit 54 configured to detect a motor current Im that actually flows through the motor 84, and a sensing unit 60 configured to sense that the motor 84 is in a shaft locked state. The setting unit 51, the control unit 52, and the sensing unit 60 are implemented by the CPU executing software stored in a storage area such as a ROM.

The control unit 52 is configured to perform feedback control so that a deviation between the target current It set by the setting unit 51 and the motor current Im detected by the detection unit 54 becomes zero.

The drive unit 53 has, for example, a transistor (FET) as a switching element connected between a positive electrode-side line of a power supply and a coil of the motor 84. The drive unit 53 is configured to control the drive of the motor 84 by driving a gate of the transistor to switch the transistor.

The detection unit 54 is configured to detect the motor current Im flowing through the motor 84, from a voltage generated across both ends of a shunt resistor connected to the drive unit 53.

The setting unit 51 is configured to set the target current It for moving the piston 82 so that a target value Lt of the amount of movement of the support member 73 of the jack unit 71 and a detection value La perceived using an output value of the movement amount sensor 75 coincide with each other. It may be exemplified that the target value Lt is a value corresponding to a target vehicle height selected by a user via a user interface provided to the two-wheeled motor vehicle 1.

In a case of moving the piston 82 in a direction of discharging oil from the reservoir chamber 83, the setting unit 51 is configured to set the target current It to a predetermined first value for increasing a vehicle height. On the other hand, in a case of moving the piston 82 in a direction of discharging oil from the jack chamber 72, the setting unit 51 is configured to set the target current It to a predetermined second value for decreasing a vehicle height. Note that, when a current in a direction of rotating the motor 84 so as to move the piston 82 to discharge oil from the reservoir chamber 83 is denoted with a plus and a current in a direction of rotating the motor 84 so as to move the piston 82 to discharge oil from the jack chamber 72 is denoted with a minus, it may be exemplified that the first value is 8A and the second value is −8A.

In determining the moving direction of the piston 82, the setting unit 51 first decides whether a subtraction value $\Delta L$ (=Lt−La) obtained by subtracting the detection value La perceived using an output value of the movement amount sensor 75 from the target value Lt is larger than 0. When the subtraction value $\Delta L$ is larger than 0 ($\Delta L>0$), the setting unit 51 sets the target current It to the first value so as to move the piston 82 in the direction of discharging the oil from the reservoir chamber 83. On the other hand, when the subtraction value $\Delta L$ is smaller than 0 ($\Delta L<0$), the setting unit 51 sets the target current It to the second value so as to move the piston 82 in the direction of discharging the oil from the jack chamber 72 On the other hand, when the subtraction value $\Delta L$ is 0 ($\Delta L=0$), the setting unit 51 sets the target current It to 0.

In addition, even when the subtraction value $\Delta L$ is not 0, the setting unit 51 sets the target current It to 0 if the sensing unit 60 senses that the motor 84 is in the shaft locked state.

Figure 4:
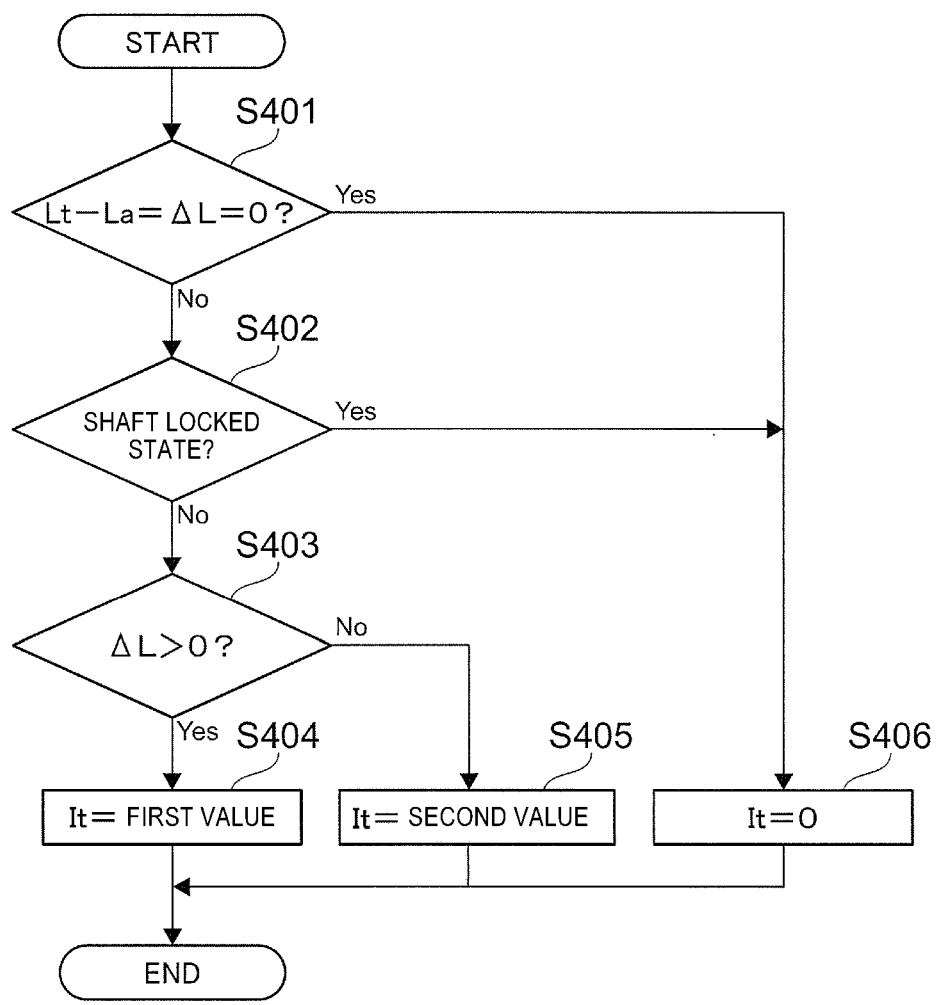
FIG. 4 is a flowchart showing an example of a procedure of setting processing of a target current It, which is performed by a setting unit 51.

FIG. 4 is a flowchart showing an example of a procedure of setting processing of the target current It, which is performed by the setting unit 51.

The setting unit 51 repeatedly executes this processing, for example, with a predetermined control cycle (for example, every 1 millisecond).

First, the setting unit 51 decides whether the subtraction value $\Delta L$ (=Lt−La) is 0 (S401). When the subtraction value $\Delta L$ is not 0 (No in S401), the setting unit 51 decides whether the sensing unit 60 has sensed that the motor 84 is in the shaft locked state (S402). That is, the setting unit 51 decides whether a signal indicating the shaft locked state has been acquired from the sensing unit 60. When the shaft locked state is not sensed (No in S402), the setting unit 51 decides whether the subtraction value $\Delta L$ is larger than 0 (S403). When the subtraction value $\Delta L$ is larger than 0 (Yes in S403), the setting unit 51 sets the target current It to the first value so as to move the piston 82 in the direction of discharging the oil from the reservoir chamber 83 (S404). On the other hand, when the subtraction value $\Delta L$ is smaller than 0 (No in S403), the setting unit 51 sets the target current It to the second value so as to move the piston 82 in the direction of discharging the oil from the jack chamber 72 (S405).

On the other hand, when the shaft locked state is sensed (Yes in S402), the setting unit 51 sets the target current It to 0 (S406). In addition, when the subtraction value $\Delta L$ is 0 (Yes in S401), the setting unit 51 sets the target current It to 0 (S406).

Note that, the setting unit 51 may decide whether an absolute value of the subtraction value $\Delta L$ is larger than a predetermined reference value, and when the absolute value of the subtraction value $\Delta L$ is equal to or smaller than the reference value, the setting unit may set the target current It to 0A, and when the absolute value of the subtraction value $\Delta L$ is larger than the reference value, the setting unit may set the target current It to the first value or the second value according to the sign of the subtraction value $\Delta L$.

(Sensing Unit 60)

Figure 5:
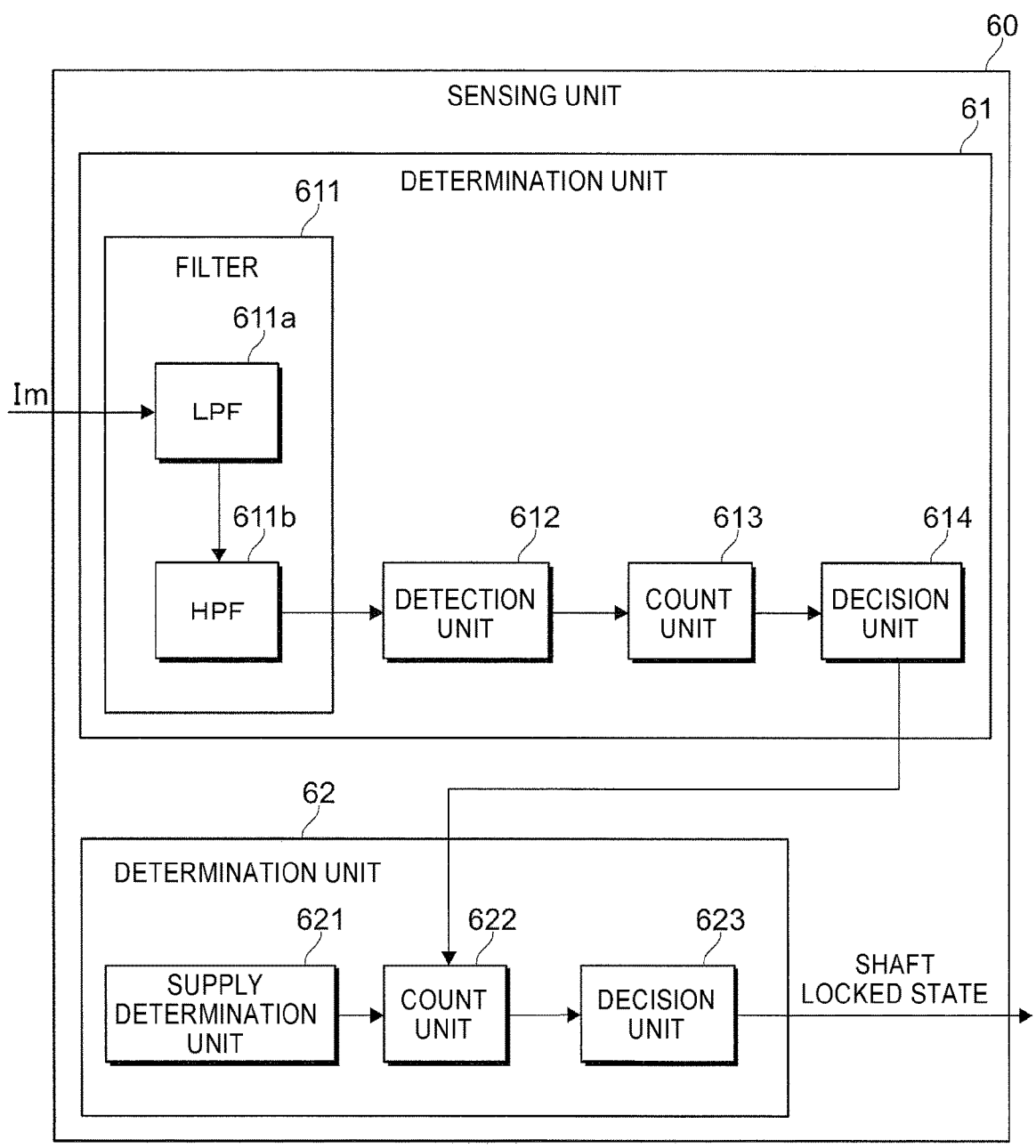
FIG. 5 shows an example of a block diagram of a sensing unit 60.

FIG. 5 shows an example of a block diagram of the sensing unit 60.

Figure 6:
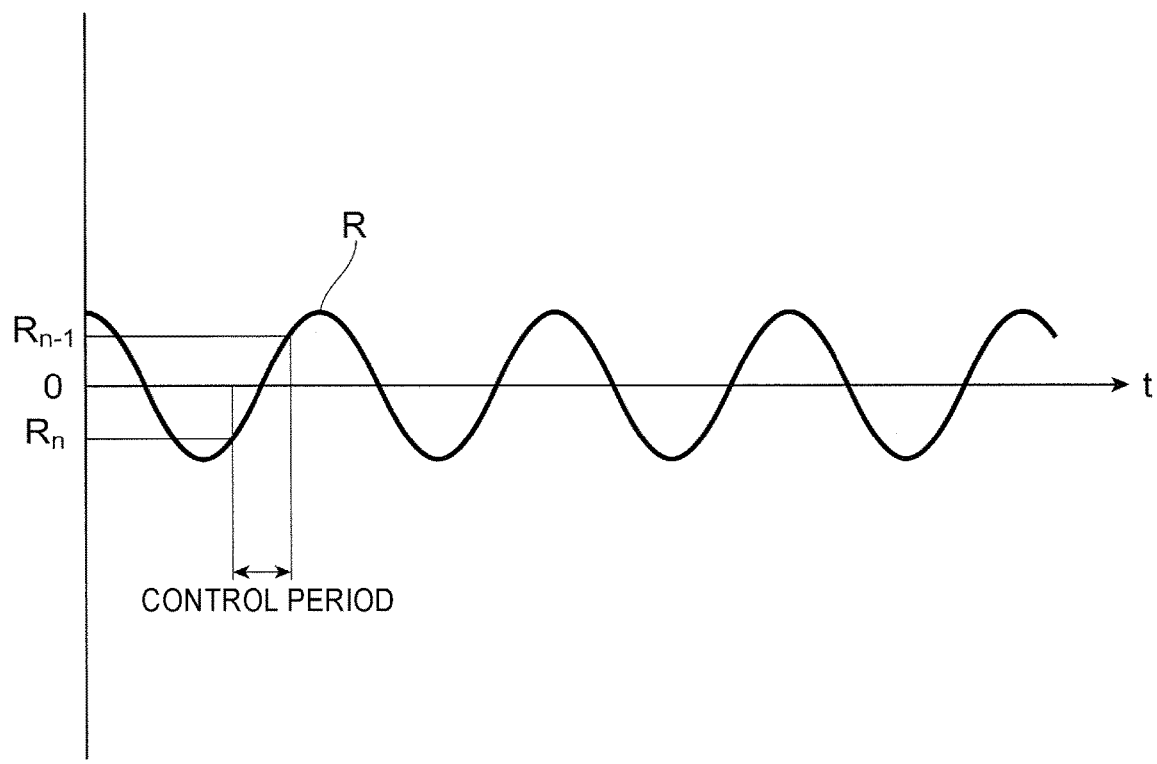
FIG. 6 shows an example of a waveform R output from a filter 611.

FIG. 6 shows an example of a waveform R output from a filter 611.

The sensing unit 60 includes a determination unit 61 configured to determine whether the motor 84 is in a rotation state by using a frequency of the motor current Im detected by the detection unit 54 (in other words, a frequency of the waveform R), and a determination unit 62 configured to determine whether the motor 84 is in the shaft locked state by using a determination result of the determination unit 61.

The determination unit 61 has a filter 611 configured to filter the motor current Im detected by the detection unit 54. The filter 611 has an LPF 611a configured to implement filtering processing corresponding to a low-pass filter, and an HPF 611b configured to implement filtering processing corresponding to a high-pass filter. Thereby, the filter 611 is configured to output a waveform R exemplified in FIG. 6, in which a DC component and a noise have been removed from the motor current Im. Note that, the filter 611 may be configured to output the waveform R, in which slight increase/decrease vibrations generated by noises have been removed from an output from the HPF 611b.

In addition, the determination unit 61 has a detection unit 612 configured to detect that the waveform R output from the filter 611 has passed 0 (hereinafter, may be referred to as 'zero cross'). The detection unit 612 is configured to detect the zero cross by perceiving that signs of two values, which are consecutive in a predetermined control cycle, of the waveform R output from the filter 611 have changed. More specifically, the detection unit 612 detects the zero cross when a sign of a value obtained by multiplying a current value $R_n$, and a previous value $R_{n-1}$ of the waveform R exemplified in FIG. 6 is negative.

Further, the determination unit 61 has a count unit 613 configured to count the number of times of zero cross detected by the detection unit 612. The count unit 613 is configured to add 1 to a count value X each time the detection unit 612 detects a zero cross. Further, the count unit 613 is configured to determine whether a predetermined period, which is a period set in advance, has elapsed. When the predetermined period has elapsed, the count unit 613 outputs the count value X at a time when the predetermined period has elapsed, and resets the count value X. Note that, it may be exemplified that the predetermined period is 250 (msec).

Further, the determination unit 61 has a decision unit 614 configured to decide a rotation state of the rotating shaft of the motor 84. The decision unit 614 determines whether the count value X output from the count unit 613 in a predetermined period is equal to or larger than a predetermined reference value Xt, and decides to be a non-rotation state when the count value X is smaller than the reference value Xt. On the other hand, the decision unit 614 decides to be a rotation state, when the count value X is equal to or larger than the reference value Xt. In addition, when it is decided to be the non-rotation state, the decision unit 614 turns on a non-rotation state flag, which is a flag indicating that the motor 84 is in the non-rotation state, in a predetermined flag recording area provided in the RAM. On the other hand, when it is decided to be the rotation state, the decision unit 614 turns off the non-rotation state flag.

As described above, the determination unit 61 determines to be the rotation state, when the number of zero crosses of the waveform R in a predetermined period is equal to or larger than the reference value Xt. On the other hand, the determination unit 61 determines to be the non-rotation state, when the number of zero crosses of the waveform R in the predetermined period is smaller than the reference value Xt. In other words, when the number of zero crosses of the waveform R in a predetermined period is smaller than the reference value Xt, the determination unit 61 determines to be the non-rotation state in which the rotation speed of the motor 84 is smaller than a predetermined speed. The predetermined speed is a speed uniquely determined by a type of the motor 84, the predetermined period, and the reference value Xt. For example, when the motor 84 is a DC motor with a brush having two poles and three slots, the number of zero crosses becomes 6 each time the rotating shaft of the motor 84 rotates one revolution, so that the predetermined speed (rpm)=reference value Xt×60 (s)/(6×predetermined period(s)).

The determination unit 62 has a supply determination unit 621 configured to determine whether or not to be a supply state in which the current is supplied to the motor 84. The supply determination unit 621 determines to be the supply state when an absolute value of the motor current Im is equal to or larger than a predetermined reference value Imt. It may be exemplified that the reference value Imt is 0.1 (A).

Further, the determination unit 62 has a count unit 622 configured to count the number of times that the supply determination unit 621 determines to be the supply state after the determination unit 61 determines to be the rotation state. The count unit 622 is configured to add 1 to a count value Y each time the supply determination unit 621 determines to be the supply state. However, the count unit 622 resets the count value Y when the determination unit 61 determines to be the rotation state.

Further, the determination unit 62 has a decision unit 623 configured to decide to be the shaft locked state, when the count value Y counted by the count unit 622 exceeds a predetermined reference value Yt. The decision unit 623 is configured to acquire the count value Y counted by the count unit 622, and to determine whether the count value Y exceeds the reference value Yt. The decision unit 623 decides to be the shaft locked state when the count value Y exceeds the reference value Yt, and outputs a signal indicating the shaft locked state. On the other hand, when the count value Y is equal to or smaller than the reference value Yt, the decision unit 623 does not decide to be the shaft locked state and does not output the signal indicating the shaft locked state.

In this way, the determination unit 62 decides to be the shaft locked state, when the number of times that the supply determination unit 621 has consecutively determined to be the supply state exceeds the reference value Yt, after the count value Y becomes 0, for example, the determination unit 62 determines to be the rotation state and therefore the count value Y is reset.

As described above, the decision unit 623 of the determination unit 62 decides that a period for which the absolute value of the motor current Im is equal to or larger than the predetermined reference value Imt has continued by a predetermined period from the time when the count value Y becomes zero, so that the sensing unit 60 senses the shaft locked state. Then, the sensing unit 60 outputs a signal indicating the shaft locked state.

Figure 7:
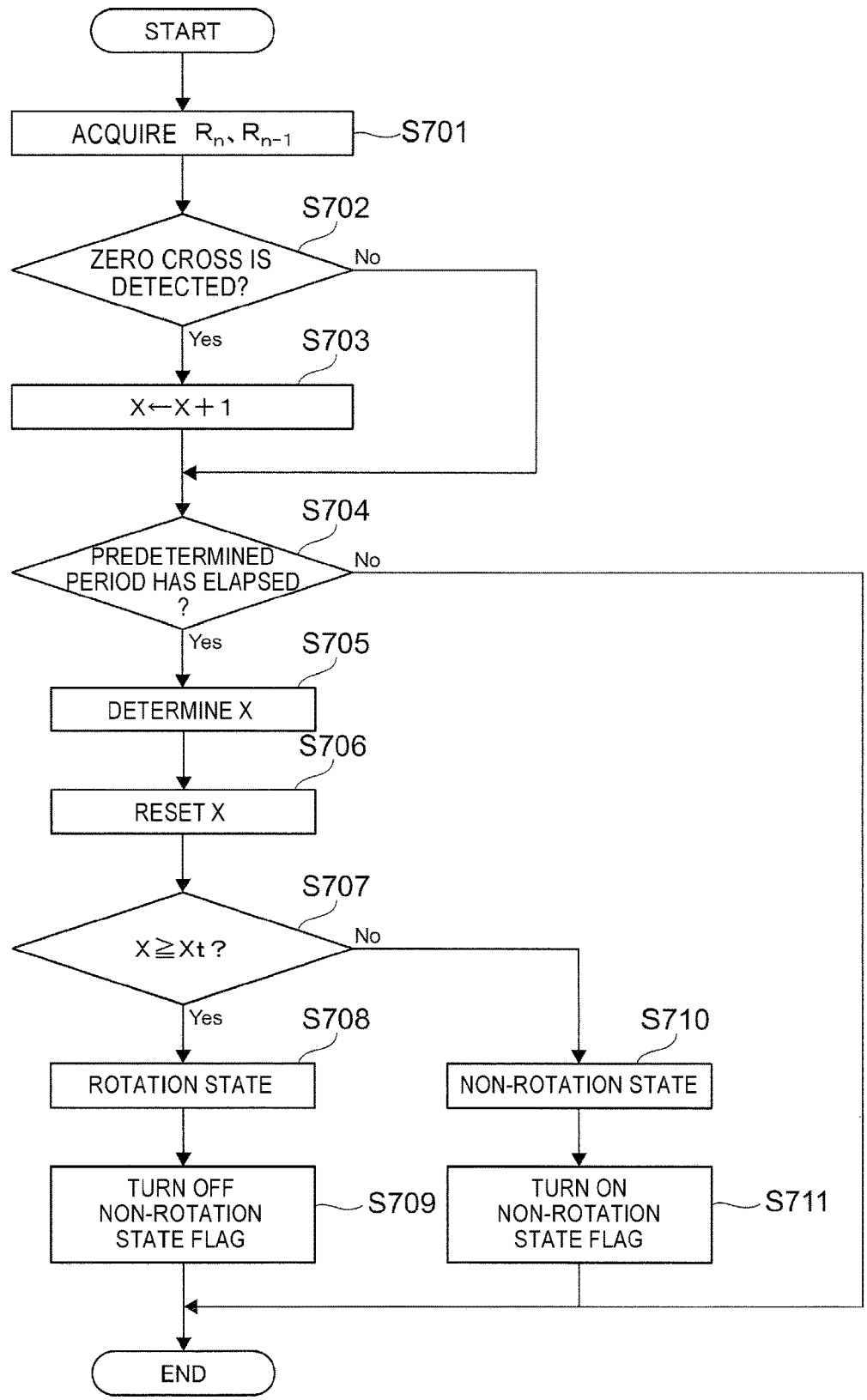
FIG. 7 is a flowchart showing an example of a procedure of rotation state determination processing that is performed by a determination unit 61.

FIG. 7 is a flowchart showing an example of a procedure of rotation state determination processing that is performed by the determination unit 61.

The determination unit 61 repeatedly executes this processing, for example, with a predetermined control cycle (for example, every 1 millisecond).

The determination unit 61 first acquires a current value $R_n$ and a previous value $R_{n-1}$ of the waveform R output from the filter 611 (S701). Thereafter, the determination unit 61 decides whether a zero cross is detected by deciding whether a sign of a value obtained by multiplying the current value $R_n$ and the previous value $R_{n-1}$ acquired in S701 is negative (S702). These are processing that is performed by the detection unit 612.

When a zero cross is detected (Yes in S702), the determination unit 61 adds 1 to the count value X (X←X+1) (S703). After adding 1 to the count value X in S703 or when it is not decided that a zero cross is detected in S702 (No in S702), the determination unit 61 decides whether a predetermined period has elapsed (S704). When the predetermined period has not elapsed (No in S704), the determination unit 61 ends the present processing. On the other hand, when the predetermined period has elapsed (Yes in S704), the determination unit 61 determines the count value X at this time as the count value X within the predetermined period (S705), and resets the count value X (S706). The processing of S703, S704, S705 and S706 is processing that is performed by the count unit 613.

Thereafter, the determination unit 61 decides whether the count value X determined in S705 is equal to or larger than the reference value Xt (S707). When the count value X is equal to or larger than the reference value Xt (Yes in S707), the determination unit 61 decides to be the rotation state (S708). Then, the determination unit 61 turns off the non-rotation state flag (S709). On the other hand, when the count value X is not equal to or larger than the reference value Xt (No in S707), the determination unit 61 decides to be the non-rotation state (S710). Then, the determination unit 61 turns on the non-rotation state flag (S711). The processing of S707, S708, S709, S710 and S711 is processing that is performed by the decision unit 614.

Figure 8:
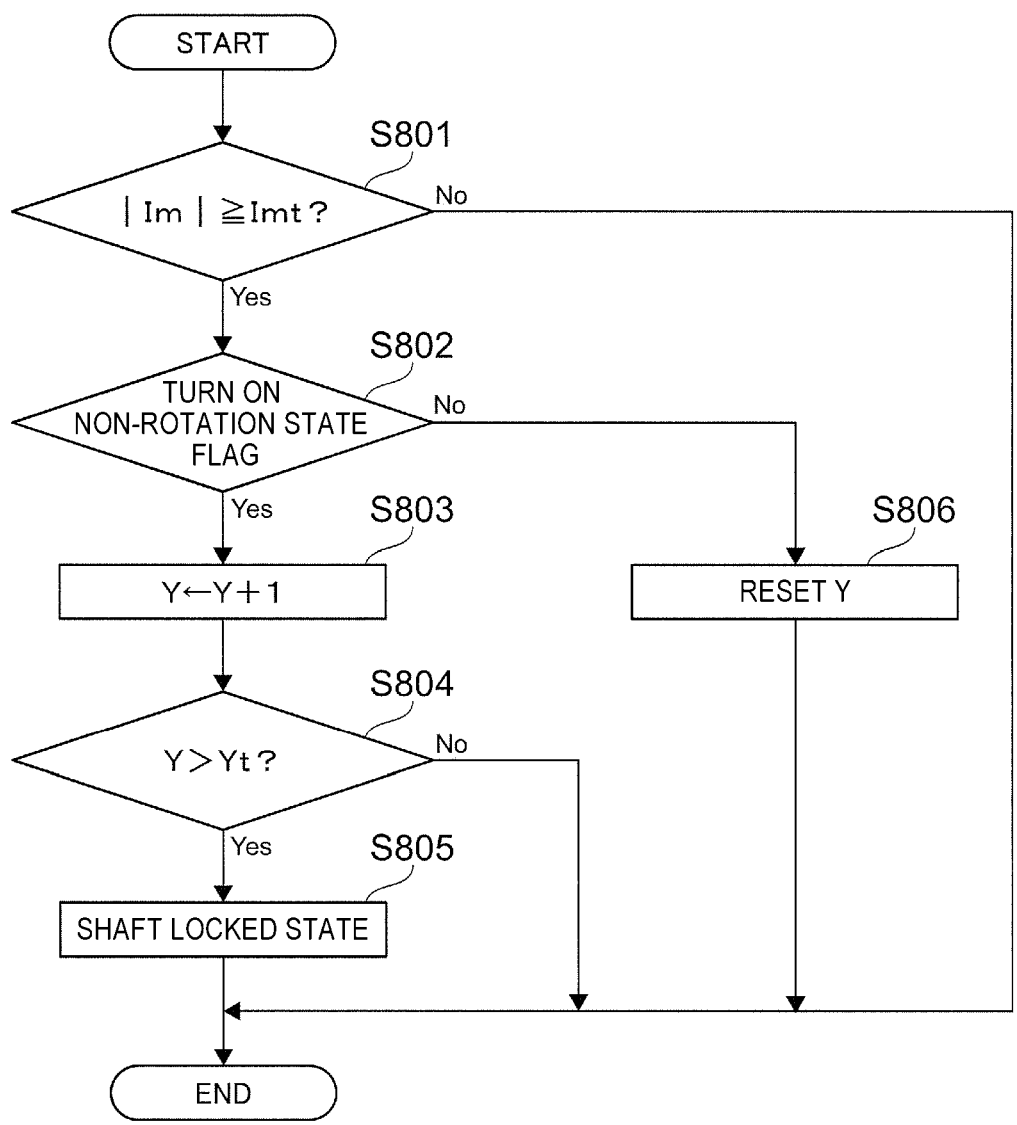
FIG. 8 is a flowchart showing an example of a procedure of shaft locked state determination processing that is performed by a determination unit 62.

FIG. 8 is a flowchart showing an example of a procedure of shaft locked state determination processing that is performed by the determination unit 62.

The determination unit 62 repeatedly executes this processing, for example, with a predetermined control cycle (for example, every 1 millisecond).

The determination unit 62 first decides whether the absolute value of the motor current Im is equal to or larger than the reference value Imt (S801). When the absolute value of the motor current Im is not equal to or larger than the reference value Imt (No in S801), the determination unit 62 ends the present processing. This is processing that is performed by the supply determination unit 621.

When the absolute value of the motor current Im is equal to or larger than the reference value Imt (Yes in S801), the determination unit 62 decides whether the non-rotation state flag is ON (S802). When the non-rotation state flag is ON (Yes in S802), the determination unit 62 adds 1 to the count value Y (Y←Y+1) (S803). S802 and S803 are processing that is performed by the count unit 622. Thereafter, the determination unit 62 decides whether the count value Y exceeds the reference value Yt (S804). When the count value Y exceeds the reference value Yt (Yes in S804), the determination unit 62 decides to be the shaft locked state (S805). S804 and S805 are processing that is performed by the decision unit 623.

On the other hand, when the non-rotation state flag is not ON (No in S802), the determination unit 62 resets the count value Y (S806) and ends the present processing. S806 is processing that is performed by the count unit 622.

As described above, the sensing unit 60 of the control device 50 decides the shaft locked state by using a motor shaft state sensing method described below. This motor shaft state sensing method has rotation state determination processing that is performed by the determination unit 61, as an example of the rotation determination process of determining, using a detected current waveform of the motor 84, whether or not to be a non-rotation state in which a rotation speed of the motor 84 is smaller than a predetermined speed. In addition, the method has S801 as an example of the current determination process of determining whether or not to be a supply state in which the absolute value of the motor current Im supplied to the motor 84 is larger than the reference value Imt. Further, the method has S802 to S805, as an example of the decision process of deciding that the motor 84 is in the shaft locked state, when it is determined to be the non-rotation state in the rotation state determination processing and it is determined to be the supply state in S801. According to the motor shaft state sensing method, for example, as compared to determining to be the shaft locked state just when the current supplied to the motor 84 is larger than the reference value, it is possible to accurately sense that the motor 84 is in the shaft locked state, regardless of change in environment.

In the rotation state determination processing that is performed by the determination unit 61, the waveform R is extracted using the current waveform of the motor 84, and the rotation speed of the motor 84 is perceived using the frequency of the extracted waveform R, i.e., the number of zero crosses of the waveform R in a predetermined period. By using this processing, for example, the configuration of the adjustment unit 70 can be made simpler and more inexpensive, as compared to a configuration including a sensor configured to detect the rotation speed of the motor 84, for example.

The control device 50 is configured to control an operation of the motor 84 by using a control method described below. This control method has a sensing process of sensing a shaft locked state by the motor shaft state sensing method, and S406 as an example of the stop process of stopping the supply of current to the motor 84 when the shaft locked state is sensed in the sensing process. According to the control method, it is possible to accurately suppress heat generation of the motor 84, regardless of change in environment.

In addition, the sensing unit 60 of the control device 50 can be regarded as a motor shaft state sensing device having following elements. The motor shaft state sensing device includes the determination unit 61 as an example of the rotation determination unit configured to determine, using a detected current waveform of the motor 84, whether or not to be a non-rotation state in which the rotation speed of the motor 84 is smaller than a predetermined speed, and the supply determination unit 621 as an example of the current determination unit configured to determine whether or not to be a supply state in which the absolute value of the motor current Im supplied to the motor 84 is larger than the reference value Imt. In addition, the motor shaft state sensing device includes the decision unit 632 as an example of the decision unit configured to decide that the motor 84 is in the shaft locked state, when it is determined to be the non-rotation state with the determination unit 61 and it is determined to be the supply state with the supply determination unit 621.

The control device 50 can be regarded as a control device of the motor 84 including the motor shaft state sensing device, and the setting unit 61 as an example of the stop unit configured to stop the supply of current to the motor 84, when it is decided to be the shaft locked state with the motor shaft state sensing device. According to the control device, it is possible to accurately suppress heat generation of the motor 84, regardless of change in environment.

Second Embodiment

Figure 9:
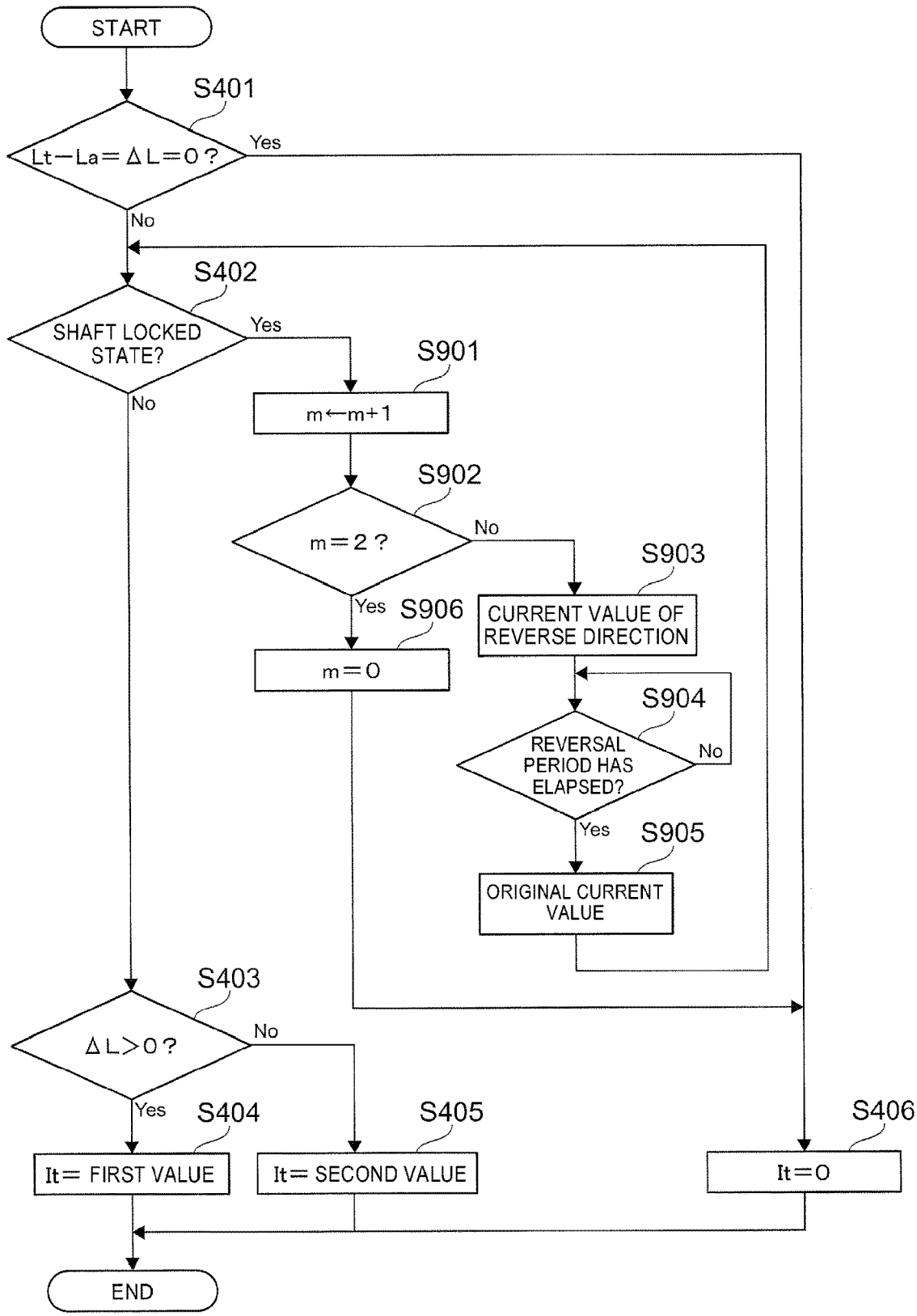
FIG. 9 is a flowchart showing an example of a procedure of setting processing according to a second embodiment, which is performed by the setting unit 51.

FIG. 9 is a flowchart showing an example of a procedure of setting processing according to a second embodiment, which is performed by the setting unit 51.

The setting processing according to the second embodiment is different from the setting processing according to the first embodiment described with reference to FIG. 4, with respect to a setting value of the target current It when the sensing unit 60 continuously senses the shaft locked state for a predetermined number of times. In the below, differences from the first embodiment are described. In the first embodiment and the second embodiment, the same processing is denoted with the same reference signs, and the detailed descriptions thereof are omitted. It may be exemplified that the predetermined number of times is two times.

First, the setting unit 51 decides whether the subtraction value $\Delta L(=Lt-La)$ is 0 (S401). When the subtraction value $\Delta L$ is not 0 (No in S401), the setting unit 51 decides whether the sensing unit 60 has sensed that the motor 84 is in the shaft locked state (S402). When the shaft locked state is not sensed (No in S402), the setting unit 51 decides whether the subtraction value $\Delta L$ is larger than 0 (S403). When the subtraction value $\Delta L$ is larger than 0 (Yes in S403), the setting unit 51 sets the target current It to the first value so as to move the piston 82 in the direction of discharging the oil from the reservoir chamber 83 (S404). On the other hand, when the subtraction value $\Delta L$ is smaller than 0 (No in S403), the setting unit 51 sets the target current It to the second value so as to move the piston 82 in the direction of discharging the oil from the jack chamber 72 (S405).

On the other hand, when the sensing unit 60 detects the shaft locked state (Yes in S402), the setting unit 51 adds 1 to the count value m (S901). Thereafter, it is decided whether the count value m is 2 (S902). When the count value m has not reached 2 (No in S902), the setting unit 51 sets the target current It to a current value of a reverse direction so as to rotate the motor 84 in a reverse direction (S903). Thereafter, it is decided whether a predetermined reversal period has elapsed (S904). When the reversal period has not elapsed (No in S904), the setting unit 51 waits until the reversal period has elapsed. On the other hand, when the reversal period has elapsed (Yes in S904), the setting unit 51 sets the target current It to an original current value so as to return the rotation direction of the motor 84 (S905). The processing of S903, S904, and S905 is processing of, for example, when the target current It at a time when the sensing unit 60 senses the shaft locked state is the first value, setting the target current It to the second value, for example, over the reversal period, and again, setting the target current It to the original first value after the reversal period has elapsed.

On the other hand, when the count value m has reached 2 in S902 (Yes in S902), the setting unit 51 sets the count value m to 0 (S906) and sets the target current It to 0 (S406).

As described above, the control device 50 according to the second embodiment controls the operation of the motor 84 by using a control method described below. This control method has a sensing process of sensing a shaft locked state by the motor shaft state sensing method, and S903 as an example of the supply process of supplying current of a reverse direction to the motor 84 when the shaft locked state is sensed in the sensing process.

In addition, the control device 50 according to the second embodiment can be regarded as a control device of the motor 84 including the motor shaft state sensing device described above, and the setting unit 61 according to the second embodiment as an example of the supply unit configured to supply current of a reverse direction to the motor 84, when it is decided to be the shaft locked state with the motor shaft state sensing device.

This makes it possible to accurately suppress heat generation of the motor 84, regardless of change in environment.

Third Embodiment

Figure 10:
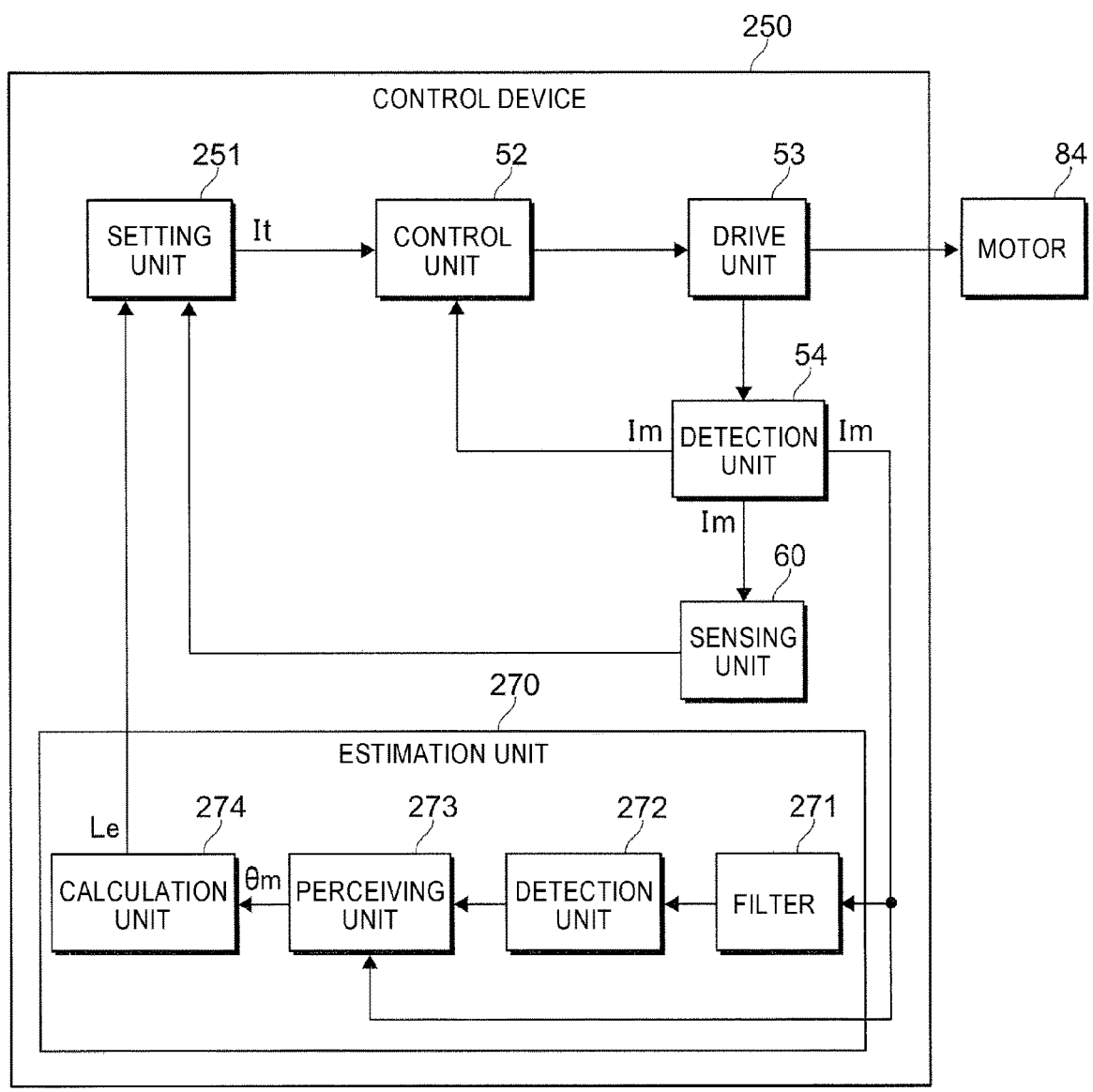
FIG. 10 shows an example of a block diagram of a control device 250 according to a third embodiment.

FIG. 10 shows an example of a block diagram of a control device 250 according to a third embodiment.

The control device 250 according to the third embodiment is different from the control device 50 according to the first embodiment, in that it includes an estimation unit 270 configured to estimate an amount of movement of the support member 73 and a setting unit 251 corresponding to the setting unit 51 is configured to set the target current It by using the amount of movement estimated by the estimation unit 270. In the below, differences from the first embodiment are described. In the first embodiment and the third embodiment, the same parts are denoted with the same reference signs, and the detailed descriptions thereof are omitted.

The estimation unit 270 has a filter 271 configured to filter the motor current Im detected by the detection unit 54. The filter 271 is the same as the filter 611 and is configured to output a waveform R exemplified in FIG. 6, in which a DC component and a noise have been removed from the motor current Im.

In addition, the estimation unit 270 has a detection unit 272 configured to detect a zero cross of the waveform R output from the filter 271. The detection unit 272 is the same as the detection unit 612, and is configured to detect a zero cross when a sign of a value obtained by multiplying a current value $R_n$ and a previous value $R_{n-1}$ of the waveform R exemplified in FIG. 6 is negative.

Further, the estimation unit 270 has a perceiving unit 273 configured to perceive a rotation angle θm of the motor 84, and a calculation unit 274 configured to calculate an amount of movement of the support member 73 by using the rotation angle θm perceived by the perceiving unit 273.

The perceiving unit 273 is configured to perceive the rotation angle θm by using information, which indicates that the detection unit 272 has detected a zero cross, and the sign of the motor current Im. For example, the perceiving unit 273 perceives the rotation angle θm in the direction of discharging oil from the reservoir chamber 83 by subtracting a minus-side count value, which is the number of times that the detection unit 272 has detected the zero cross when the sign of the motor current Im is negative, from a plus-side count value, which is the number of times that the detection unit 272 has detected the zero cross when the sign of the motor current Im is positive.

The calculation unit 274 is configured to calculate an amount of movement of the support member 73 by substituting the rotation angle θm perceived by the perceiving unit 273 into an equation determined in advance in view of a causal relationship between the rotation angle θm in the direction of discharging the oil from the reservoir chamber 83 and the amount of movement of the support member 73.

The amount of movement of the support member 73 calculated by the calculation unit 274 is an estimated amount Le of movement estimated by the estimation unit 270.

The setting unit 251 is different from the setting unit 51, in that the setting unit 251 sets the target current It by using the estimated amount Le of movement, instead of the detection value La. That is, the setting unit 251 is configured to set the target current It for moving the piston 82 so that the target value Lt and the estimated amount Le of movement coincide with each other. The setting method is as described above.

The vehicle height adjustment device 100 according to the third embodiment configured as described above includes the suspension device 23 having the spring 23s as an example of the spring, and the adjustment unit 70 configured to adjust an initial load of the spring 23s by using the motor 84 whose operation is controlled by the control device 250 as an example of the motor control device.

The control device 250 includes the estimation unit 270 configured to estimate, using a detected current waveform of the motor 84, an amount of movement of the support member 73 configured to support an end portion of the spring 23s, and the setting unit 251 configured to set the target current It to be supplied to the motor 84 by using an estimated amount Le of movement estimated by the estimation unit 270, when it is not decided to be the shaft locked state with the sensing unit 60.

According to the control device 250, the configuration of the adjustment unit 70 can be made simpler and more inexpensive, as compared to a configuration including a sensor configured to detect an amount of movement of the support member 84, for example.

The invention claimed is:

1. A motor shaft state sensing method comprising:
a rotation determination step of determining, using a detected current waveform of a motor, whether or not to be a non-rotation state in which a rotation speed of the motor is smaller than a predetermined speed;
a current determination step of determining whether or not to be a supply state in which an absolute value of current supplied to the motor is larger than a predetermined reference value; and
a decision step of deciding that the motor is in a shaft locked state, when it is determined to be the non-rotation state in the rotation determination step and it is determined to be the supply state in the current determination step,
wherein in the rotation determination step, the rotation speed is perceived using a frequency of a waveform extracted by using the current waveform,
wherein the motor is a motor provided to a vehicle height adjustment device,
wherein the current waveform is a current waveform subjected to filtering processing by a low-pass filter and a high-pass filter, and
wherein in the rotation determination step, it is decided to be the non-rotation state when a number of times of zero cross that the current waveform subjected to the filtering processing passes 0 in a predetermined period, which is a period determined in advance, is smaller than a reference value, and it is decided to be a rotation state when the number of times is equal to or larger than the reference value.

2. The motor shaft state sensing method according to claim 1, wherein in the rotation determination step, the zero cross is detected by deciding whether a sign of a value obtained by multiplying a previous value and a current value of the current waveform subjected to the filtering processing is negative.

3. A motor control method comprising:
a sensing step of sensing the shaft locked state by the motor shaft state sensing method according to claim 1; and
a stop step of stopping supply of current to the motor when the shaft locked state is sensed in the sensing step.

4. A motor control method comprising:
a sensing step of sensing the shaft locked state by the motor shaft state sensing method according to claim 1; and
a supply step of supplying current of a reverse direction to the motor when the shaft locked state is sensed in the sensing step.

5. A motor control method comprising:
a sensing step of sensing the shaft locked state by the motor shaft state sensing method according to claim 2; and
a stop step of stopping supply of current to the motor when the shaft locked state is sensed in the sensing step.

6. A motor control method comprising:
a sensing step of sensing the shaft locked state by the motor shaft state sensing method according to claim 2; and
a supply step of supplying current of a reverse direction to the motor when the shaft locked state is sensed in the sensing step.

7. A motor shaft state sensing device comprising:
a rotation determination unit configured to determine, using a detected current waveform of a motor, whether or not to be a non-rotation state in which a rotation speed of the motor is smaller than a predetermined speed;
a current determination unit configured to determine whether or not to be a supply state in which an absolute value of current supplied to the motor is larger than a predetermined reference value; and
a decision unit configured to decide that the motor is in a shaft locked state, when it is determined to be the non-rotation state with the rotation determination unit and it is determined to be the supply state with the current determination unit,
wherein the rotation determination unit is configured to perceive the rotation speed by using a frequency of a waveform extracted by using the current waveform,
wherein the current waveform is a current waveform subjected to filtering processing by a low-pass filter and a high-pass filter, and
wherein the rotation determination unit decides to be the non-rotation state when a number of times of zero cross that the current waveform subjected to the filtering processing passes 0 in a predetermined period, which is a period determined in advance, is smaller than a reference value, and decides to be a rotation state when the number of times is equal to or larger than the reference value.

8. The motor shaft state sensing device according to claim 7, wherein the rotation determination unit is configured to detect the zero cross by deciding whether a sign of a value obtained by multiplying a previous value and a current value of the current waveform subjected to the filtering processing is negative.

9. A motor control device comprising:
the motor shaft state sensing device according to claim 7; and a stop unit configured to stop supply of current to the motor when it is decided to be the shaft locked state with the motor shaft state sensing device.

10. A motor control device comprising:
the motor shaft state sensing device according to claim 7; and
a supply unit configured to supply current of a reverse direction to the motor when it is decided to be the shaft locked state with the motor shaft state sensing device.

11. A vehicle height adjustment device comprising:
a suspension device having a spring; and
an adjustment unit configured to adjust a load of the spring by using the motor whose operation is controlled by the motor control device according to claim 9.

12. A vehicle height adjustment device comprising:
a suspension device having a spring; and
an adjustment unit configured to adjust a load of the spring by using the motor whose operation is controlled by the motor control device according to claim 10.

13. The vehicle height adjustment device according to claim 11, wherein the motor control device comprises:
an estimation unit configured to estimate, using a detected current waveform of a motor, an amount of movement of a support member configured to support an end portion of the spring; and
a setting unit configured to set a target current to be supplied to the motor by using the amount of movement estimated by the estimation unit, when it is not decided to be the shaft locked state with the motor shaft state sensing device.

14. A saddle-type vehicle comprising:
a vehicle main body;
a front wheel arranged on a front side of the vehicle main body and a rear wheel arranged on a rear side of the vehicle main body;
a first suspension device arranged between the vehicle main body and the front wheel;
a second suspension device arranged between the vehicle main body and the rear wheel and having a spring; and
the vehicle height adjustment device configured to adjust at least a load of the spring according to claim 11.

15. A saddle-type vehicle comprising:
a vehicle main body;
a front wheel arranged on a front side of the vehicle main body and a rear wheel arranged on a rear side of the vehicle main body;
a first suspension device arranged between the vehicle main body and the front wheel;
a second suspension device arranged between the vehicle main body and the rear wheel and having a spring; and
the vehicle height adjustment device configured to adjust at least a load of the spring according to claim 12.

16. A saddle-type vehicle comprising:
a vehicle main body;
a front wheel arranged on a front side of the vehicle main body and a rear wheel arranged on a rear side of the vehicle main body;
a first suspension device arranged between the vehicle main body and the front wheel;
a second suspension device arranged between the vehicle main body and the rear wheel and having a spring; and
the vehicle height adjustment device configured to adjust at least a load of the spring according to claim 13.

17. A motor control device comprising:
the motor shaft state sensing device according to claim 8; and
a stop unit configured to stop supply of current to the motor when it is decided to be the shaft locked state with the motor shaft state sensing device.

18. A motor control device comprising:
the motor shaft state sensing device according to claim 8; and
a supply unit configured to supply current of a reverse direction to the motor when it is decided to be the shaft locked state with the motor shaft state sensing device.

19. A vehicle height adjustment device comprising:
a suspension device having a spring; and
an adjustment unit configured to adjust a load of the spring by using the motor whose operation is controlled by the motor control device according to claim 17.

20. A vehicle height adjustment device comprising:
a suspension device having a spring; and
an adjustment unit configured to adjust a load of the spring by using the motor whose operation is controlled by the motor control device according to claim 18.

* * * * *